United States Patent
Miles

(10) Patent No.: US 6,714,369 B2
(45) Date of Patent: Mar. 30, 2004

(54) METHOD AND APPARATUS FOR WRITING CLOCK DATA TO A STORAGE MEDIUM

(75) Inventor: Michael A. Miles, Hayling Island (GB)

(73) Assignee: Xyratex Technology Limited, Havant (GB)

( * ) Notice: Subject to any disclaimer, the term of this patent is extended or adjusted under 35 U.S.C. 154(b) by 202 days.

(21) Appl. No.: 09/796,437

(22) Filed: Mar. 2, 2001

(65) Prior Publication Data

US 2001/0033447 A1 Oct. 25, 2001

Related U.S. Application Data

(60) Provisional application No. 60/187,014, filed on Mar. 6, 2000.

(51) Int. Cl.[7] ............................................... G11B 5/09
(52) U.S. Cl. ............................. 360/51; 360/75; 360/76
(58) Field of Search ........................... 360/51, 75, 78.14, 360/76, 77.04, 77.08, 77.07, 53, 51.75

(56) References Cited

U.S. PATENT DOCUMENTS

| | | | | |
|---|---|---|---|---|
| 3,099,822 A | * | 7/1963 | Williams | 360/54 |
| 4,414,589 A | * | 11/1983 | Oliver et al. | 360/77.07 |
| 5,333,140 A | * | 7/1994 | Moraru et al. | 714/719 |
| 5,448,429 A | * | 9/1995 | Cribbs et al. | 360/75 |
| 6,005,751 A | * | 12/1999 | Kazmierczak et al. | 360/244 |
| 6,172,830 B1 | * | 1/2001 | Leonard | 360/51 |
| 6,359,749 B1 | * | 3/2002 | Fukushima | 360/121 |
| 6,388,833 B1 | * | 5/2002 | Golowka et al. | 360/77.02 |

FOREIGN PATENT DOCUMENTS

WO    WO 98/31015    7/1998

OTHER PUBLICATIONS

"Regenerative Clock Technique for Servo Track Writers", IBM Technical Disclosure Bulletin, US, IBM Corp., New York, vol. 33, No. 5, Oct. 1990.

* cited by examiner

Primary Examiner—David Hudspeth
Assistant Examiner—Natalia Figueroa
(74) Attorney, Agent, or Firm—Pillsbury Winthrop LLP

(57) ABSTRACT

A first clock track is written to a data storage region of a storage medium at a first position between first and second boundaries. A first set of further clock tracks is written to other positions on the data storage region, these other positions lying between the first position and the first boundary. A second set of further clock tracks is written to other positions on the data storage region, these second other positions lying between the first position and the second boundary.

15 Claims, 2 Drawing Sheets

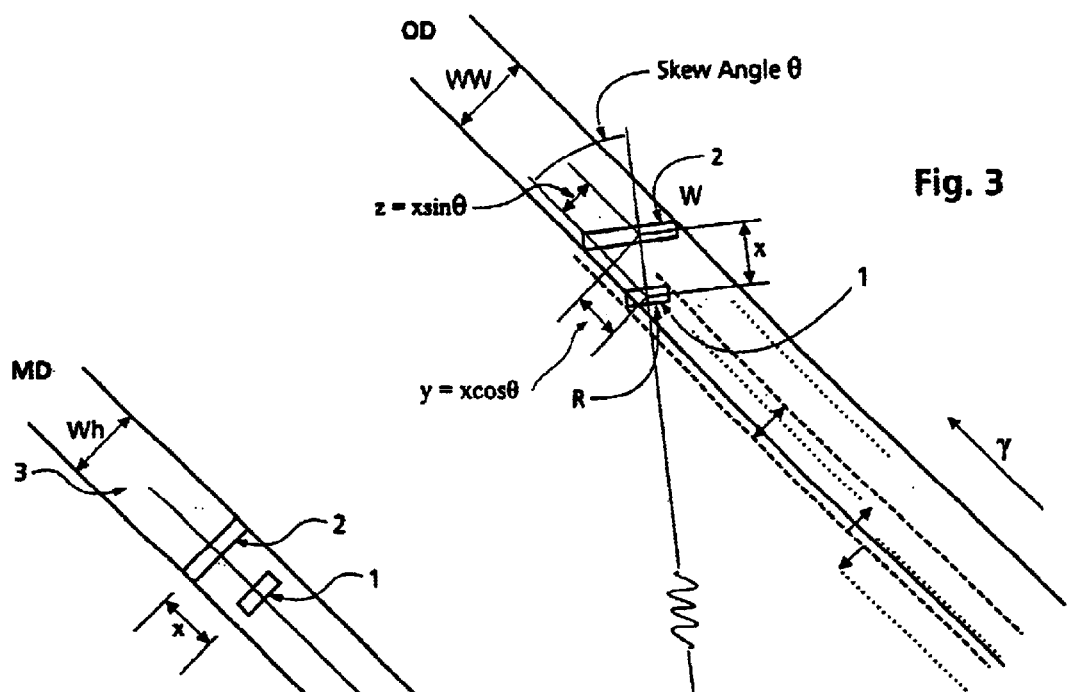
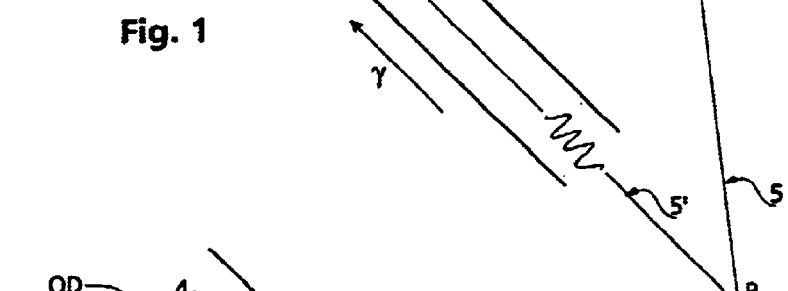
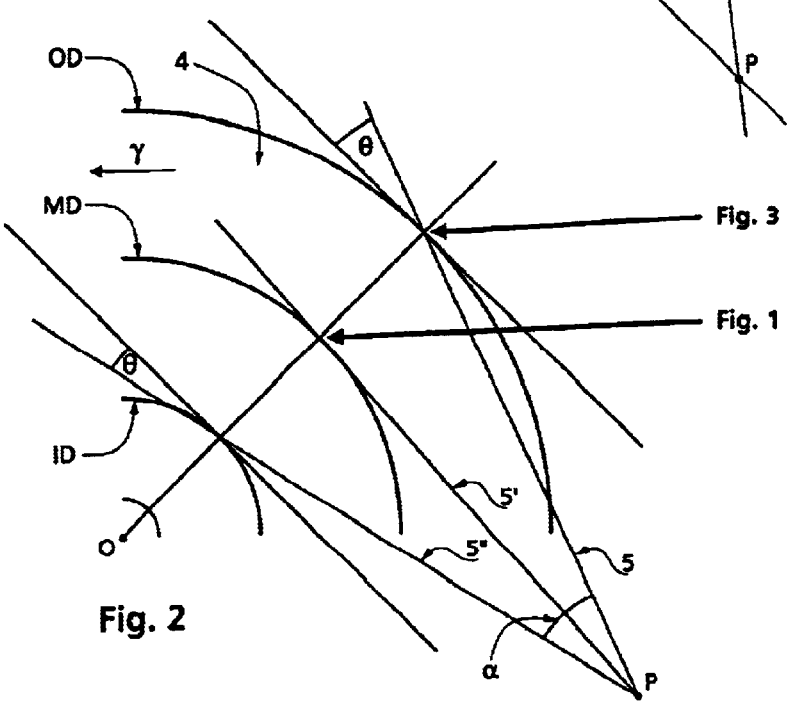
Fig. 1
Fig. 2
Fig. 3

METHOD AND APPARATUS FOR WRITING CLOCK DATA TO A STORAGE MEDIUM

This application claims priority to U.S. Provisional Application No. 60/187,014, filed Mar. 6. 2000, the contents of which are incorporated by reference in their entirety.

The present invention relates to a method and an apparatus for writing clock data to a storage medium.

Information for systems such as data processing systems is typically stored on storage media. Particular use is made of storage disks such as magnetic disks, opto-magnetic disks, and the like. One type of magnetic disk arrangement is a so-called "head disk assembly" which is intended normally to be permanently fixed in a data processing system; the head disk assembly includes the magnetic disk medium itself and the associated read and write head or heads (the "product" head or heads) which write data to the disk and read data from the disk. Another type of magnetic disk is of a type known as "removable media" which normally consists of a magnetic disk medium in a protective plastics case which can be used to transfer data between data processing systems by physical transfer of the disk itself from one machine to another.

In a known method of manufacturing storage media such as hard disk drives, a head disk assembly consisting of the product head(s), the disk or disks, the motor and arm electronics, is mounted in a mastering station known as a servo-writer. The servo-writer writes a pattern of magnetic information (the "servo track pattern") onto the disk. The servo track pattern becomes the master reference which is used by the disk drive during normal operation in order to locate the tracks and sectors on the disk for data storage and retrieval. Clearly, the servo track pattern has to be accurately written to the disk at very well defined positions.

In order to be able to write the servo pattern onto the correct positions on the disk during manufacture of the disk, in one commonly used process, a (usually temporary) "clock" track is written onto the disk to serve as a timing reference during writing of the servo pattern. Conventionally, a separate clock head is used to write the clock track onto the disk and to read the clock track from the disk so that the servo tracks, which are written with the disk drive's product head, can be phase aligned with respect to the clock track and each other. However, the use of a dedicated clock track writing head is an expensive addition to the manufacturing process and further requires that the servo tracks be written in a clean room because the clock track writing head has to be inserted into the open (unsealed) head disk assembly. Moreover, in practice the clock heads have to be replaced on a daily basis because of damage which occurs during use.

There have been several proposals for methods and apparatus for writing the servo tracks to a disk without the need for a dedicated clock head. Typically, and put briefly, an internal write head of a head disk assembly is used to write an initial clock track around the disk. That initial clock track is then read by an internal read head of the head disk assembly and the next clock track is written by the internal write head, with reading of the previous clock track being interleaved with writing of the present clock track. The servo patterns or tracks are written at appropriate locations on the disk, interleaved with the clock tracks, the positions of the servo patterns or tracks being determined in accordance with timing information obtained from the clock tracks. Such methods, or similar methods, are disclosed in for example U.S. Pat. No. 5,485,322, U.S. Pat. No. 5,448,429, and U.S. Pat. No. 5,668,679.

In our WO-A-98/31015, the entire disclosure of which is incorporated herein by reference, there is disclosed another method and apparatus for writing clock data to a storage medium, such as a disk. The storage medium has tracks on which data can be stored. Clock data is written to a present track on the storage medium. The written clock data is read from that track. Clock data for a subsequent track on the storage medium is generated from the clock data read from said present track. The phase of the generated clock data for the subsequent track is compared with a reference timing signal and the phase of the generated clock data for the subsequent track is adjusted in accordance with said comparison. The phase adjusted clock data for the subsequent track is then written to said subsequent track. In this method and apparatus, it is again not necessary to provide a dedicated clock read/write head. As in other proposals of this type, the servo information is written to the disk using the clock track data to position the servo information very accurately. To save time, it is preferred that the servo information in a track be written alternately with the clock data in that track, i.e. for any track, a portion of clock data is written, that clock data being phase aligned with the clock data in the previous track, and then a burst of servo data is written, again appropriately phase aligned with the previous track, followed by the next portion of clock data, and so on.

In such self-clocking methods, as mentioned above, it is necessary to read clock data from a previously written track whilst writing, in an interleaved manner, clock data to the next (present) track. Modern disk drives currently use a magnetoresistive read element in tandem with a conventional thin film write element in which the read and write elements are offset by a fixed distance from each other. An example of such an arrangement is shown in FIG. 1 which shows schematically a magnetoresistive read element 1 and an associated write element 2. The centres of the read and write elements 1, 2 are separated by an offset x and the read and write elements 1, 2 are shown located over a track 3 on a disk. Typically, x may be in the range 1 to 3 $\mu$m and the width of the write element 2 is 1.8 $\mu$m. Where the read and write elements 1, 2 are aligned with the direction of the track 3 as shown in FIG. 1, there is a write-to-read delay which depends on the rotational speed v and also on the distance of the track 3 from the centre of the disk. For example, if the rotational speed v of the disk is 5400 rpm and the offset x between the read and write elements 1, 2 is 1 $\mu$m, then for a track at a 20 mm radius, the write-to-read delay is approximately 90 ns, and for a track at a radius of 46 mm, the write-to-read delay is approximately 40 ns. This delay, which as shown varies according to radial position across the disk, has to be compensated for during the clock track copying process.

Referring to FIG. 2, there is shown a disk 4 rotating about a centre O. The arm 5 which carries the read and write elements 1, 2 is mounted for pivotal movement about a pivot point P which is displaced from the centre of rotation O of the disk 4. This arrangement allows the arm 5 to be rigidly mounted and allows the disk to be rotated with a constant angular velocity. As can be appreciated from a study of FIG. 2, the pivotal mounting of the arm 5 about a pivot point P which is displaced from the centre of rotation O of the disk 4 means that the arm 5 will not be tangential to the disk 4 for most of the pivotal travel α of the arm 5. Instead, the arm 5 and therefore the head containing the read and write elements 1, 2 will be skewed relative to the tracks on the disk 4. Skew of the head containing the read and write elements 1, 2 relative to the tracks on the disk 4 causes a degradation of the signal read back from a clock track on the disk 4 and can make it very difficult or impossible to read back a previously written track with the read element 2 and then immediately write the next track with the write element 1. One theoretical solution to this would be to jog the read/write head between successive read and write steps but, at the frequency with which the clock tracks are written in order to obtain high throughput during manufacturing, this is technically not feasible nor practical. It is therefore desirable to minimise the amount of skew of the head during the self-servowriting process.

According to a first aspect of the present invention, there is provided a method of writing clock data to a storage medium, the storage medium having a data storage region having first and second boundaries, the method comprising the steps of: writing a first clock track to the data storage region at a first position between the first and second boundaries; writing a first set of further clock tracks to other positions on the data storage region, said other positions for the first set of further clock tracks lying between the first position and the first boundary; and, writing a second set of further clock tracks to other positions on the data storage region, said other positions for the second set of further clock tracks lying between the first position and the second boundary.

This "dual-pass" method for writing the clock tracks to the storage medium allows the clock tracks to be written quickly with the minimum of compensation being required to compensate for movement of the write element relative to the storage medium.

Preferably, each of the first set of further clock tracks is generated from data obtained by reading clock data from a previous clock track and wherein each of the second set of further clock tracks is generated from data obtained by reading clock data from a previous clock track. In this embodiment, the signal read back from the storage medium always has a relatively large amplitude.

In a preferred embodiment, the tracks are read and written respectively with a read element and a write element that are offset relative to each other and which are skewed relative to the storage medium by a skew angle which varies according to position of the read and write elements relative to the storage medium, said first position being where the skew angle is substantially a minimum.

Thus, in the preferred embodiment, the present invention uses a dual pass self-servowrite process starting at a position where the skew angle of the read and write elements to the storage medium is a minimum (preferably zero) and writing clock tracks first to one boundary of the data storage region, returning to the start position, and then writing clock tracks to the other boundary of the data storage region. In this way, the skew angle always aids the clock recovery (i.e. the reading back of clock data) as the read back signal is enhanced from a minimum of say half amplitude at the start position to full amplitude at each boundary. This ensures that the quality and level of the clock data read back by the read element 1 are each as high as possible at all times. The read element will normally always be over known data and not random data. In contrast, writing in only one direction would cause the skew angle to work against clock recovery as the amplitude, at least towards the end of clock writing, would be less than half and probably less than is feasible to recover, and the read element may be positioned some of the time over random data on the disk.

Typically, the storage medium is a rotating disk,

Each of the first set of further clock tracks is preferably successively closer to the first boundary.

Each of the second set of further clock tracks is preferably successively closer to the second boundary.

The method may comprise the step of writing servo data to the storage medium interleaved with the clock data. Such servo data is used to locate the read and write elements of the fully assembled and preconditioned storage medium in use by an end user.

The method may comprise the step of writing location data to the storage medium and comprising the step of reading the location data to locate the position where writing of the second set of further clock tracks is to be initiated. This enables the entire set of clock tracks across the storage medium to be properly and accurately aligned with each other to provide a contiguous clock track across the whole of the data storage region of the storage medium.

According to a second aspect of the present invention, there is provided a method of writing clock data to tracks on a storage medium using a read element and a write element that are offset relative to each other and which are skewed relative to the storage medium by a skew angle which varies according to position of the read and write elements relative to the storage medium, the storage medium having a data storage region having first and second boundaries, the method comprising the steps of: (A) writing first clock data to a first clock track on the storage medium at a position at which the skew angle is substantially a minimum using the write element; (B) reading the first clock data using the read element; (C) generating clock data for a subsequent track from data obtained by reading the first clock data; (D) writing said generated clock data to said subsequent track using the write element, said subsequent track being closer to the first boundary than said first clock track; (E) writing clock data to further tracks using the write element, each of said further tracks being successively closer to the first boundary, the clock data for each of said further tracks being generated from data obtained by reading the clock data of a previous track; (F) moving the read and write elements substantially to said position at which the skew angle is substantially a minimum; (G) writing clock data to a track using the write element, said track being closer to the second boundary than said first clock track; and, (H) writing clock data to further tracks using the write element, each of said further tracks being successively closer to the second boundary, the clock data for each of said further tracks being generated from data obtained by reading the clock data of a previous track.

The method may comprise the step of writing servo data to the storage medium interleaved with the clock data.

The method preferably comprises the step of writing location data to the storage medium and comprising the step of reading the location data to locate said position at which the skew angle is substantially a minimum to enable the read and write elements to be moved substantially to said position at which the skew angle is substantially a minimum.

According to a third aspect of the present invention, there is provided apparatus for writing clock data to a storage medium, the apparatus comprising: a storage medium which has a data storage region having first and second boundaries to which clock data is to be written; a read element and a write element that are offset relative to each other and which are skewed relative to the storage medium by a skew angle which varies according to position of the read and write elements relative to the storage medium; a controller arranged to cause the write element to write first clock data to a first clock track on the storage medium at a position at which the skew angle is substantially a minimum; a clock data generator for generating clock data for a subsequent track from data obtained by reading the first clock data using the read element; a controller arranged to cause said generated clock data to be written to said subsequent track using the write element such that said subsequent track is closer to the first boundary than said first clock track; a controller arranged to cause clock data to be written to further tracks using the write element such that each of said further tracks is successively closer to the first boundary, the clock data for each of said further tracks being generated from data obtained by reading the clock data of a previous track; a controller arranged to cause the read and write elements to be moved substantially to said position at which the skew angle is substantially a minimum; a controller arranged to cause clock data to be written to a track using the write element such that said track is closer to the second boundary than said first clock track; and, a controller arranged to cause clock data to be written to further tracks using the write element such that each of said further tracks is successively closer to the second boundary, the clock data for each of said further tracks being generated from data obtained by reading the clock data of a previous track.

The apparatus may include a controller arranged to cause writing of servo data to the storage medium interleaved with the clock data.

The apparatus preferably includes a controller arranged to cause location data to be written to the storage medium and to cause the location data to be read to locate said position at which the skew angle is substantially a minimum to enable the read and write elements to be moved substantially to said position at which the skew angle is substantially a minimum.

It will be appreciated that the controllers may be embodied as a single controller and that the or each controller may be embodied in discrete logic circuits, in one or more application-specific integrated circuits (ASICs), and/or software running on appropriate programmable apparatus.

An embodiment of the present invention will now be described by way of example with reference to the accompanying drawings, in which:

FIG. 1 is a schematic plan view of read and write elements positioned over a track on a disk;

FIG. 2 is a schematic plan view showing a portion of a disk and an arm carrying read and write elements;

FIG. 3 is a schematic plan view showing read and write elements at a skew angle to a track of a disk; and, FIG. 4 is a schematic plan view showing a portion of servo and clock track data on the disk.

Figure 4:
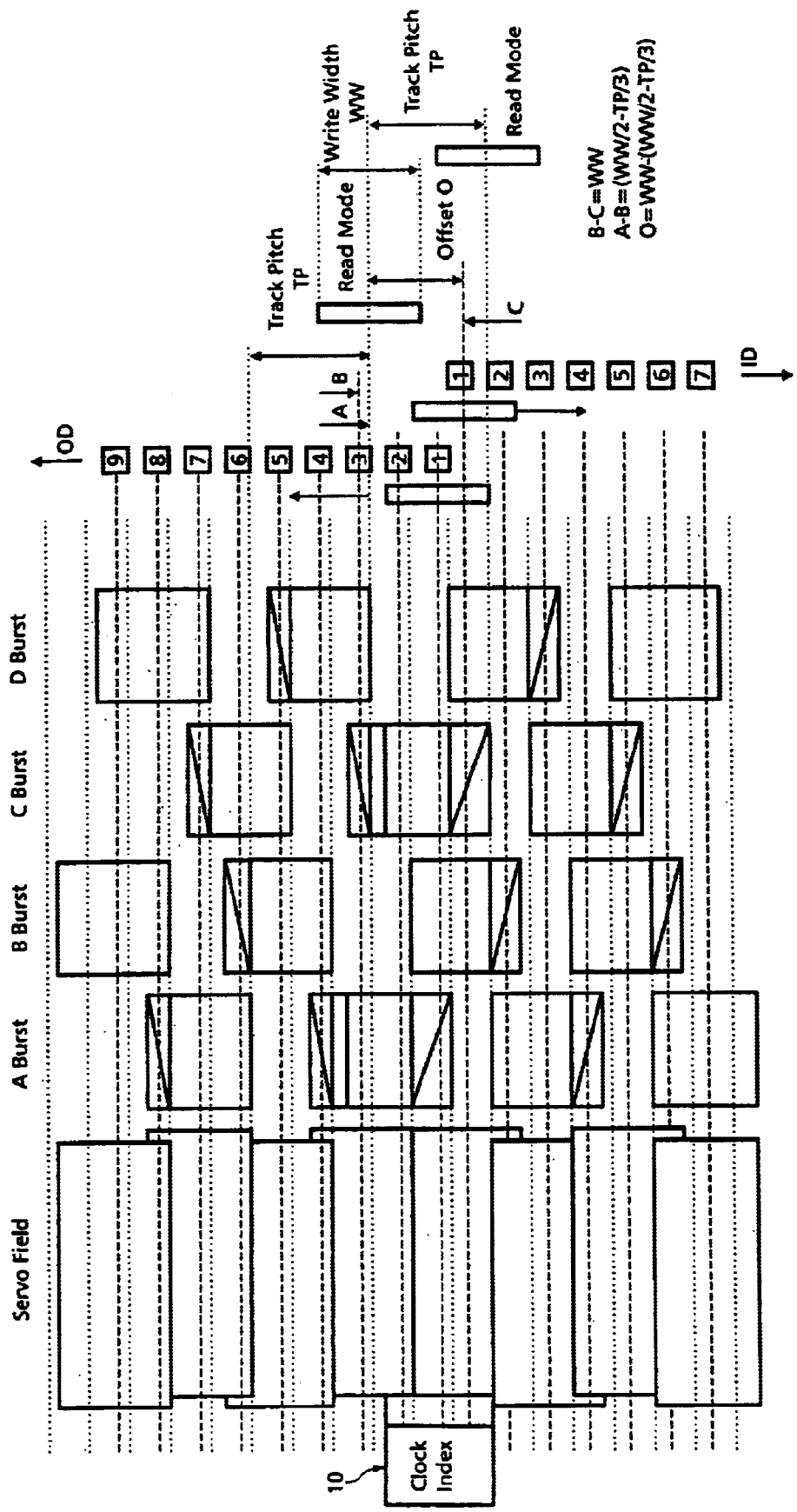

In a typical self-clocking disk, a first clock track is written to the disk using a write element which is the data write element or one of the data write elements that is used to write data to the disk during actual use of the disk by an end user. The first clock track is written around the whole disk to be contiguous with an exact number of magnetic transitions and a small closure error which is within predetermined limits. The internal read and write elements of the disk are then moved, typically by a half track or one third track width. The internal read element is used to read back a portion of the just written clock track. The data read back is used to generate the clock track data to be written to the next clock track with the internal write element. This reading and writing is carried out in an interleaved manner around the track. Thus, going round the track, a short portion of the clock track just written is read using the internal read element and a short burst of clock data is generated by appropriate electronics and then written to the next clock track by the internal write element. A phase locked loop, which may be a digital phase locked loop, is used to ensure that the phase of the clock data about to be written is aligned (within small predetermined limits) with the phase of the clock data of the previous clock track. As disclosed in our WO-A-98/31015, the phase of the generated clock data can be adjusted by use of a reference timing signal. Phase adjustment may be achieved in other ways. In some circumstances, phase adjustment may not be required. At predetermined positions around the clock track being written, servo data is written, that servo data providing the servo tracks which are used to locate the read and write elements during normal operation of the disk in use by an end user. After this second clock track with servo data has been written, the read and write elements are again moved by a one half or one third track width and the process repeated until servo data has been written at all of the predetermined positions across the disk. The clock tracks, which are only used temporarily during the servo writing process in order to enable the servo data to be written at the correct positions, can then be erased leaving the servo data at the appropriate positions. Such erasure will typically occur when the disk is formatted.

As mentioned above, and as indicated in FIG. 2, in a typical head disk assembly, the arm 5 which carries the read and write elements 1, 2 is mounted for pivotal movement about a pivot point P which is displaced from the centre of rotation O of the disk 4. This means that, at a general position over the disk 4, the read and write elements 1, 2 are orientated at a skew angle θ to the direction of the track 3. (It will be understood that the skew angle θ in the example shown is the angle between a line joining the centres of the read and write elements 1, 2 and the longitudinal axis of the track concerned.) The effective offset y between the read and write elements 1, 2 is defined by y=x cos θ where x is the actual offset between the read and write elements 1, 2. As can be seen, the effective offset y between the read and write elements 1, 2 therefore varies with skew angle θ as the read and write elements 1, 2 are moved to different radial positions over the disk 4. It should be appreciated that this variation in effective offset between the read and write elements 1, 2 because of the varying skew angle θ is in addition to the variation in the read-to-write delay with radial position that occurs because of the different linear speed of portions of the disk 4 at different radial positions given that the disk 4 is rotated at a constant angular velocity, as discussed in the introduction above. More importantly, as the skew angle θ increases, the skewed read element 1 is positioned over less and less of the clock track being read back. This means that the level of the signal read back decreases with increasing skew angle. Eventually, the level and quality of the signal read back from the previous clock track can become so low that it is difficult or impossible to generate the clock data for the next track to be written and to ensure that the phase of the next clock track is aligned (within appropriate limits) with the previous clock track.

As is well known, the disk 4 has a data storage region on which data can be stored and which is located between two boundaries conventionally known as the inner diameter (ID) and the outer diameter (OD). Physical end stops are usually provided to define the extreme limits of movement of the arm 5 between the ID and the OD.

In order to minimise the effect of the skew angle, and in accordance with the present invention, the first clock track mentioned above is written to a position on the disk 4 which is between the ID and the OD. That position is preferably where the skew angle is a minimum and most preferably zero. In a preferred embodiment, the arm 5 and the head disk assembly generally is arranged such that the skew angle is a minimum or zero at the middle diameter (MD), which is located half way between the ID and the OD. After the first clock track is written, subsequent clock tracks are written from that first clock track to one of the ID and the OD, with data for a particular clock track being generated from data obtained by reading back a previously written clock track (which is preferably the immediately preceding clock track). Each written clock track is successively closer to the ID or OD as the case may be. After all of the tracks have been written out to the ID or OD as the case may be, the arm 5 is returned to the MD and clock tracks are written to the other of the ID and OD, again moving successively towards the other of the ID and OD as the case may be, with each clock track data being generated from data obtained by reading back the clock track of a previously written track. In this way, the skew angle always aids the clock recovery (i.e. the reading back of clock data) as the read back signal is enhanced from a minimum of say half amplitude at the start position to full amplitude at each boundary. This ensures that the quality and level of the clock data read back by the read element 1 are each as high as possible at all times. The present invention therefore uses a dual pass self-servowrite process starting at a position where the skew angle is a minimum (preferably zero) and writing clock tracks first to one boundary of the data storage region, returning to the start position, and then writing clock tracks to the other boundary of the data storage region. The read element will normally always be over known data and not random data. In contrast, writing in only one direction would cause the skew angle to work against clock recovery as the amplitude, at least towards the end of clock writing, would be less than half and probably less than is feasible to recover, and the read element may be positioned some of the time over random data on the disk.

It will be appreciated that it is desirable to minimise any error which might be associated with the join in the clock tracks between the first pass from the start position to one of the boundaries and the second pass from the start position to the other boundary of the data storage region. This is desirable in order to leave a contiguous pattern of clock tracks and, more importantly, a properly phase aligned and located set of servo data in both the radial and circumferencial directions across the whole of the data storage region.

A detailed example of an example of a method according to the present invention will now be described.

The positioner (not shown) which controls movement of the product arm 5 is initially calibrated by moving the arm 5 between the OD position (indicated by 5 in FIG. 2) and the ID position (indicated by 5" in FIG. 2) and a start gray code computed for the MD position or zero skew position (indicated by 5' in FIG. 2) where the servo track writing process will begin. If desired, at each of the OD, MD and ID positions, the write-to-read delay can be measured and the measurement used to modify a nominal offset table which is stored for use in the overall control loop which controls movement of the arm 5.

The arm 5 is then moved to the MD position 5' which is the nominal zero skew position for the head disk assembly being prepared. A contiguous clock track is written and closure verified within predetermined limits, in a manner well known in itself. When this first clock track is written, a unique time redundant clock index mark 10 is also written to the disk 4. The position of the clock index 10 is verified with a phase locked loop which is locked to interleaved clock bursts to provide the initial starting point.

Servo information is then written in order to allow the read and write elements 1, 2 to be positioned at the correct radial position after the first set of clock tracks has been written in the first servowriting pass and just prior to writing the second set of clock tracks in the second pass mentioned above. It will be appreciated that there are many different ways of radially locating the initial clock track and that what follows is only one specific example. In this specific example, five servo tracks are written with quadrature amplitude bursts in the servo sectors, with synchronisation being maintained by the interleaved bursts, with the positioner moving the arm 5 in either one half or one third steps towards the OD. The sequence starts with a 'C' burst with A, B & D erased, followed by 'A&C' burst, then 'A' burst on its own. This sequence preconditions the servo burst patterns to allow the first clock track to be properly located after the first set of clock tracks towards for example the OD have been written and prior to writing the second set of clock tracks towards the ID, and allows the first and second sets to be aligned both radially and circumferentially. The sequence continues with a 'D' burst and C erased. The read and write elements 1, 2 are then stepped back to the initial start position and five tracks are again written with quadrature bursts towards the ID. The read and write elements 1, 2 are then stepped towards the start position until the output of the demodulated signal (C−D/C+D) is a minimum using a binary search on the DC component of the error signal. (This could alternatively be achieved by for example closing a servo loop around this error signal.) The steps are then continued in two servo track intervals for three steps and the DC component of the error signal recorded. A binary search is again performed to minimise the demodulated signal and the difference between the data intended to be written and the actual data recorded. This difference is stored as an offset between the two passes of the servo track writing process. This will normally be required because the head write width and the track spacing are different such that moving in different directions will cause a variation offset in track pitch as written and encoded in the bursts. By measuring the actual position as demodulated and comparing to the position from the move system, the offset can be computed. This portion of the disk is now DC erased ready to commence the servo track writing process proper.

In the next step, the process starts again with the writing of a contiguous clock track at the MD, checking for closure, and calibrating the write-to-read delay. Writing commences towards the OD as described above, with reading of a previous clock track to obtain a signal from which the clock data for the next clock track to be written is generated. The gray codes are decremented to count the tracks during this process and the clock index mark 10 is left outside the clock interleaves.

After the first set of clock tracks has been written from the MD to the OD, the arm 5 is moved back to the nominal start position less four servo tracks and the clock resynchronised to the sector timing marks previously written using the phase locked loop. Using the sequence of servo data originally written as described above, the position where (C−D/C+D) is a minimum with (B>A) is located. The positioner is then operated to step the read and write elements 1, 2 four servo tracks towards the start position and the phase locked loop is used to synchronise to the originally written clock track and index mark 10. The positioner now steps one servo track minus the previously calibrated offset.

Having now located the positioner in the appropriate radial and circumferential position, the second pass of the self-servo write process is made towards the ID, again with clock data for a track to be written being generated from data obtained by reading back clock data from the previous track.

In accordance with the present invention, by using two passes of the read and write elements 1, 2, starting from a generally or substantially central position and writing first to one edge, returning to the start position and then writing to the other edge, the varying skew angle aids clock recovery by maximising the read back signal amplitude at all times. This ensures that the signal read back at any point on the disk by the read element 1 has the largest possible value given the constraints on the design of the head disk assembly. Servo data is written at appropriate positions in an interleaved manner with the writing of the clock tracks. As described above, in the preferred embodiment, the disk is conditioned by writing an index mark and servo data around the initial clock track so that the position of the initial clock track in a radial direction as well as in a circumferential direction can be accurately located so that, in turn, all of the clock tracks and interleaved servo data are effectively contiguous both in the radial and circumferential directions.

An embodiment of the present invention has been described with particular reference to the example illustrated. However, it will be appreciated that variations and modifications may be made to the example described within the scope of the present invention.

Reference is made to copending patent application numbers (1) entitled "A CLOCKING METHOD AND APPARATUS FOR A STORAGE MEDIUM" and (2) entitled "METHOD AND APPARATUS FOR WRITING CLOCK DATA TO A STORAGE MEDIUM" of even date, which are owned by the owner of the present application, and the entire contents of which are incorporated herein by reference.

What is claimed is:

1. A method of writing clock data to a storage medium, the storage medium having a data storage region having first and second boundaries, the method comprising the steps of:
    writing a first clock track to the data storage region at a first position between the first and second boundaries;
    writing a first set of further clock tracks to other positions on the data storage region, said other positions for the first set of further clock tracks lying between the first position and the first boundary; and,
    writing a second set of further clock tracks to other positions on the data storage region, said other positions for the second set of further clock tracks lying between the first position and the second boundary.

2. A method according to claim 1, wherein each of the first set of further clock tracks is generated from data obtained by reading clock data from a previous clock track and wherein each of the second set of further clock tracks is generated from data obtained by reading clock data from a previous clock track.

3. A method according to claim 2, wherein the tracks are read and written respectively with a read element and a write element that are offset relative to each other and which are skewed relative to the storage medium by a skew angle which varies according to position of the read and write elements relative to the storage medium, said first position being where the skew angle is substantially a minimum.

4. A method according to claim 1, wherein each of the first set of further clock tracks is successively closer to the first boundary.

5. A method according to claim 1, wherein each of the second set of further clock tracks is successively closer to the second boundary.

6. A method according to claim 1, comprising the step of writing servo data to the storage medium interleaved with the clock data.

7. A method according to claim 1, comprising the step of writing location data to the storage medium and comprising the step of reading the location data to locate the position where writing of the second set of further clock tracks is to be initiated.

8. A method of writing clock data to tracks on a storage medium using a read element and a write element that are offset relative to each other and which are skewed relative to the storage medium by a skew angle which varies according to position of the read and write elements relative to the storage medium, the storage medium having a data storage region having first and second boundaries, the method comprising the steps of:
    (A) writing first clock data to a first clock track on the storage medium at a position at which the skew angle is substantially a minimum using the write element;
    (B) reading the first clock data using the read element;
    (C) generating clock data for a subsequent track from data obtained by reading the first clock data;
    (D) writing said generated clock data to said subsequent track using the write element, said subsequent track being closer to the first boundary than said first clock track;
    (E) writing clock data to further tracks using the write element, each of said further tracks being successively closer to the first boundary, the clock data for each of said further tracks being generated from data obtained by reading the clock data of a previous track;
    (F) moving the read and write elements substantially to said position at which the skew angle is substantially a minimum;
    (G) writing clock data to a track using the write element, said track being closer to the second boundary than said first clock track; and
    (H) writing clock data to further tracks using the write element, each of said further tracks being successively closer to the second boundary, the clock data for each of said further tracks being generated from data obtained by reading the clock data of a previous track.

9. A method according to claim 8, comprising the step of writing servo data to the storage medium interleaved with the clock data.

10. A method according to claim 8, comprising the step of writing location data to the storage medium and comprising the step of reading the location data to locate said position at which the skew angle is substantially a minimum to enable the read and write elements to be moved substantially to said position at which the skew angle is substantially a minimum.

11. A method according to claim 9, comprising the step of writing location data to the storage medium and comprising the step of reading the location data to locate said position at which the skew angle is substantially a minimum to enable the read and write elements to be moved substantially to said position at which the skew angle is substantially a minimum.

12. Apparatus for writing clock data to a storage medium, the apparatus comprising:
    a storage medium which has a data storage region having first and second boundaries to which clock data is to be written;
    a read element and a write element that are offset relative to each other and which are skewed relative to the storage medium by a skew angle which varies according to position of the read and write elements relative to the storage medium;
    a controller arranged to cause the write element to write first clock data to a first clock track on the storage medium at a position at which the skew angle is substantially a minimum;

a clock data generator for generating clock data for a subsequent track from data obtained by reading the first clock data using the read element;

a controller arranged to cause said generated clock data to be written to said subsequent track using the write element such that said subsequent track is closer to the first boundary than said first clock track;

a controller arranged to cause clock data to be written to further tracks using the write element such that each of said further tracks is successively closer to the first boundary, the clock data for each of said further tracks being generated from data obtained by reading the clock data of a previous track;

a controller arranged to cause the read and write elements to be moved substantially to said position at which the skew angle is substantially a minimum;

a controller arranged to cause clock data to be written to a track using the write element such that said track is closer to the second boundary than said first clock track; and, a controller arranged to cause clock data to be written to further tracks using the write element such that each of said further tracks is successively closer to the second boundary, the clock data for each of said further tracks being generated from data obtained by reading the clock data of a previous track.

13. Apparatus according to claim 12, comprising a controller arranged to cause writing of servo data to the storage medium interleaved with the clock data.

14. A Apparatus according to claim 12, comprising a controller arranged to cause location data to be written to the storage medium and to cause the location data to be read to locate said position at which the skew angle is substantially a minimum to enable the read and write elements to be moved substantially to said position at which the skew angle is substantially a minimum.

15. Apparatus according to claim 13, comprising a controller arranged to cause location data to be written to the storage medium and to cause the location data to be read to locate said position at which the skew angle is substantially a minimum to enable the read and write elements to be moved substantially to said position at which the skew angle is substantially a minimum.

* * * * *